United States Patent
Evans et al.

(10) Patent No.: US 7,773,770 B2
(45) Date of Patent: Aug. 10, 2010

(54) SUBSTITUTING OR REPLACING COMPONENTS IN MEDIA OBJECTS BASED ON STEGANOGRAPHIC ENCODING

(75) Inventors: Douglas B. Evans, San Francisco, CA (US); William Y. Conwell, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 12/107,484

(22) Filed: Apr. 22, 2008

(65) Prior Publication Data
US 2008/0196059 A1   Aug. 14, 2008

Related U.S. Application Data

(63) Continuation of application No. 11/739,534, filed on Apr. 24, 2007, now Pat. No. 7,362,879, which is a continuation of application No. 11/145,515, filed on Jun. 3, 2005, now Pat. No. 7,209,573, which is a continuation of application No. 10/448,544, filed on May 29, 2003, now Pat. No. 6,917,691, which is a continuation of application No. 09/473,396, filed on Dec. 28, 1999, now Pat. No. 6,577,746.

(51) Int. Cl.
G06K 9/00 (2006.01)
H04N 1/40 (2006.01)
H04L 9/32 (2006.01)

(52) U.S. Cl. .................. 382/100; 358/3.28; 713/176

(58) Field of Classification Search .................. 382/100, 382/112, 232, 305, 306; 358/1.13, 1.18, 358/3.28; 705/75; 713/176
See application file for complete search history.

(56) References Cited

U.S. PATENT DOCUMENTS

| | | |
|---|---|---|
| 3,984,624 A | 10/1976 | Waggener |
| 4,025,851 A | 5/1977 | Haselwood et al. |
| 4,184,700 A | 1/1980 | Greenaway |
| 4,225,967 A | 9/1980 | Miwa et al. |
| 4,230,990 A | 10/1980 | Lert, Jr. et al. |

(Continued)

FOREIGN PATENT DOCUMENTS

| | | |
|---|---|---|
| CA | 2235002 | 12/1998 |
| DE | 3806411 | 9/1989 |
| DE | 19521969 | 2/1997 |
| EP | 366381 | 10/1989 |
| EP | 372 601 | 6/1990 |

(Continued)

OTHER PUBLICATIONS van Schyndel et al., "A Digital Watermark," IEEE International Conference on Image Processing, Nov. 13-16, 1994, pp. 86-90.

(Continued)

*Primary Examiner*—Yon Couso

(57) ABSTRACT

The application discloses various methods and systems to provide substitute or replacement components for media objects (e.g., audio, video or images). The substitute or replacement components can be substituted for or to replace corresponding components when making copies of media objects. One claim includes: an apparatus comprising: a processor; and memory. The memory includes instructions for execution by said processor. The instructions include instructions to: upon receipt of a copy request, determine whether an object to be copied comprises a steganographic signal hidden within at least one component of the object; if the object comprises a steganographic signal hidden therein, obtain a substitute or replacement component corresponding to the steganographic signal; and execute the copy request of the object to yield a copy object including providing in the copy object the substitute or replacement component for the at least one component of the object. Of course, other apparatus, methods and combinations are provided as well.

27 Claims, 1 Drawing Sheet

U.S. PATENT DOCUMENTS

| | | |
|---|---|---|
| 4,238,849 A | 12/1980 | Gassmann |
| 4,252,995 A | 2/1981 | Schmidt et al. |
| 4,296,326 A | 10/1981 | Haslop et al. |
| 4,297,729 A | 10/1981 | Steynor et al. |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,389,671 A | 6/1983 | Posner et al. |
| 4,395,600 A | 7/1983 | Lundy et al. |
| 4,416,001 A | 11/1983 | Ackerman et al. |
| 4,423,415 A | 12/1983 | Goldman |
| 4,425,642 A | 1/1984 | Moses et al. |
| 4,476,468 A | 10/1984 | Goldman |
| 4,523,508 A | 6/1985 | Mayer et al. |
| 4,528,588 A | 7/1985 | Lofberg |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Lofberg |
| 4,618,257 A | 10/1986 | Bayne et al. |
| 4,637,051 A | 1/1987 | Clark |
| 4,639,779 A | 1/1987 | Greenberg |
| 4,647,974 A | 3/1987 | Butler et al. |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | Cause D'Agraives et al. |
| 4,682,794 A | 7/1987 | Margolin |
| 4,703,476 A | 10/1987 | Howard |
| 4,712,103 A | 12/1987 | Gotanda |
| 4,718,106 A | 1/1988 | Weinblatt |
| 4,723,149 A | 2/1988 | Harada |
| 4,739,377 A | 4/1988 | Allen |
| 4,750,173 A | 6/1988 | Bluthgen |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,874,936 A | 10/1989 | Chandler et al. |
| 4,876,617 A | 10/1989 | Best et al. |
| 4,879,747 A | 11/1989 | Leighton et al. |
| 4,884,139 A | 11/1989 | Pommier |
| 4,885,632 A | 12/1989 | Mabey et al. |
| 4,888,798 A | 12/1989 | Earnest |
| 4,903,301 A | 2/1990 | Kondo et al. |
| 4,908,836 A | 3/1990 | Rushforth et al. |
| 4,908,873 A | 3/1990 | Philibert et al. |
| 4,918,484 A | 4/1990 | Ujiie et al. |
| 4,920,503 A | 4/1990 | Cook |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,947,028 A | 8/1990 | Gorog |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,475 A | 11/1990 | Sant'Anselmo |
| 4,972,476 A | 11/1990 | Nathans |
| 4,977,594 A | 12/1990 | Shear |
| 4,979,210 A | 12/1990 | Nagata et al. |
| 4,996,530 A | 2/1991 | Hilton |
| 5,003,590 A | 3/1991 | Lechner et al. |
| 5,010,405 A | 4/1991 | Schreiber et al. |
| 5,023,907 A | 6/1991 | Johnson |
| 5,027,401 A | 6/1991 | Soltesz |
| 5,034,982 A | 7/1991 | Heninger et al. |
| 5,036,513 A | 7/1991 | Greenblatt |
| 5,040,059 A | 8/1991 | Leberl |
| 5,053,956 A | 10/1991 | Donald et al. |
| 5,062,666 A | 11/1991 | Mowry et al. |
| 5,063,446 A | 11/1991 | Gibson |
| 5,073,899 A | 12/1991 | Collier et al. |
| 5,073,925 A | 12/1991 | Nagata et al. |
| 5,075,773 A | 12/1991 | Pullen et al. |
| 5,077,608 A | 12/1991 | Dubner |
| 5,077,795 A | 12/1991 | Rourke et al. |
| 5,079,648 A | 1/1992 | Maufe |
| 5,091,966 A | 2/1992 | Bloomberg et al. |
| 5,095,196 A | 3/1992 | Miyata |
| 5,103,459 A | 4/1992 | Gilhousen et al. |
| 5,113,437 A | 5/1992 | Best |
| 5,113,445 A | 5/1992 | Wang |
| 5,128,525 A | 7/1992 | Stearns et al. |
| 5,144,660 A | 9/1992 | Rose |
| 5,146,457 A | 9/1992 | Veldhuis et al. |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,168,146 A | 12/1992 | Marshall et al. |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,212,551 A | 5/1993 | Conanan |
| 5,213,337 A | 5/1993 | Sherman |
| 5,216,724 A | 6/1993 | Suzuki et al. |
| 5,228,056 A | 7/1993 | Schilling |
| 5,243,411 A | 9/1993 | Shirochi et al. |
| 5,243,423 A | 9/1993 | DeJean et al. |
| 5,245,165 A | 9/1993 | Zhang |
| 5,245,329 A | 9/1993 | Gokcebay |
| 5,247,364 A | 9/1993 | Banker et al. |
| 5,253,078 A | 10/1993 | Balkanski et al. |
| 5,257,119 A | 10/1993 | Funada et al. |
| 5,259,025 A | 11/1993 | Monroe et al. |
| 5,267,334 A | 11/1993 | Normille et al. |
| 5,280,537 A | 1/1994 | Sugiyama et al. |
| 5,288,976 A | 2/1994 | Citron |
| 5,291,243 A | 3/1994 | Heckman et al. |
| 5,293,399 A | 3/1994 | Hefti |
| 5,295,203 A | 3/1994 | Krause et al. |
| 5,299,019 A | 3/1994 | Pack et al. |
| 5,305,400 A | 4/1994 | Butera |
| 5,315,098 A | 5/1994 | Tow |
| 5,319,453 A | 6/1994 | Copriviza et al. |
| 5,319,724 A | 6/1994 | Blonstein et al. |
| 5,319,735 A | 6/1994 | Preuss et al. |
| 5,321,470 A | 6/1994 | Hasuo et al. |
| 5,325,167 A | 6/1994 | Melen |
| 5,327,237 A | 7/1994 | Gerdes et al. |
| 5,337,362 A | 8/1994 | Gormish et al. |
| 5,349,655 A | 9/1994 | Mann |
| 5,351,302 A | 9/1994 | Leighton et al. |
| 5,371,792 A | 12/1994 | Asai et al. |
| 5,374,976 A | 12/1994 | Spannenburg |
| 5,379,345 A | 1/1995 | Greenberg |

| Patent | Date | Name |
|---|---|---|
| 5,385,371 A | 1/1995 | Izawa |
| 5,387,941 A | 2/1995 | Montgomery et al. |
| 5,394,274 A | 2/1995 | Kahn |
| 5,396,559 A | 3/1995 | McGrew |
| 5,398,283 A | 3/1995 | Virga |
| 5,404,160 A | 4/1995 | Schober et al. |
| 5,404,377 A | 4/1995 | Moses |
| 5,408,542 A | 4/1995 | Callahan |
| 5,416,307 A | 5/1995 | Danek et al. |
| 5,418,853 A | 5/1995 | Kanota et al. |
| 5,422,963 A | 6/1995 | Chen et al. |
| 5,422,995 A | 6/1995 | Aoki et al. |
| 5,425,100 A | 6/1995 | Thomas et al. |
| 5,428,606 A | 6/1995 | Moskowitz |
| 5,428,607 A | 6/1995 | Hiller et al. |
| 5,428,731 A | 6/1995 | Powers |
| 5,432,542 A | 7/1995 | Thibadeau et al. |
| 5,432,870 A | 7/1995 | Schwartz |
| 5,444,518 A | 8/1995 | Hashiguchi et al. |
| 5,446,273 A | 8/1995 | Leslie |
| 5,448,375 A | 9/1995 | Cooper et al. |
| 5,450,122 A | 9/1995 | Keene |
| 5,450,490 A | 9/1995 | Jensen et al. |
| 5,461,426 A | 10/1995 | Limberg et al. |
| 5,463,209 A | 10/1995 | Figh et al. |
| 5,469,222 A | 11/1995 | Sprague |
| 5,469,506 A | 11/1995 | Berson et al. |
| 5,473,631 A | 12/1995 | Moses |
| 5,479,168 A | 12/1995 | Johnson et al. |
| 5,481,294 A | 1/1996 | Thomas et al. |
| 5,486,686 A | 1/1996 | Zdybel, Jr. |
| 5,488,664 A | 1/1996 | Shamir |
| 5,493,677 A | 2/1996 | Balogh et al. |
| 5,495,581 A | 2/1996 | Tsai |
| 5,496,071 A | 3/1996 | Walsh |
| 5,499,294 A | 3/1996 | Friedman |
| 5,502,576 A | 3/1996 | Ramsay et al. |
| 5,515,081 A | 5/1996 | Vasilik |
| 5,515,451 A | 5/1996 | Tsuji |
| 5,521,722 A | 5/1996 | Colvill et al. |
| 5,524,933 A | 6/1996 | Kunt et al. |
| 5,530,751 A | 6/1996 | Morris |
| 5,530,759 A | 6/1996 | Braudaway et al. |
| 5,530,852 A | 6/1996 | Meske, Jr. et al. |
| 5,532,920 A | 7/1996 | Hartrick et al. |
| 5,537,223 A | 7/1996 | Curry |
| 5,539,471 A | 7/1996 | Myhrvold et al. |
| 5,539,735 A | 7/1996 | Moskowitz |
| 5,541,662 A | 7/1996 | Adams et al. |
| 5,544,255 A | 8/1996 | Smithies et al. |
| 5,548,646 A | 8/1996 | Aziz et al. |
| 5,557,333 A | 9/1996 | Jungo et al. |
| 5,559,559 A | 9/1996 | Jungo et al. |
| 5,568,179 A | 10/1996 | Diehl et al. |
| 5,568,550 A | 10/1996 | Ur |
| 5,568,570 A | 10/1996 | Rabbani |
| 5,572,010 A | 11/1996 | Petrie |
| 5,572,247 A | 11/1996 | Montgomery |
| 5,576,532 A | 11/1996 | Hecht |
| 5,579,124 A | 11/1996 | Aijala et al. |
| 5,581,686 A | 12/1996 | Koppolu |
| 5,581,760 A | 12/1996 | Atkinson |
| 5,582,103 A | 12/1996 | Tanaka et al. |
| 5,587,743 A | 12/1996 | Montgomery |
| 5,590,197 A | 12/1996 | Chen et al. |
| 5,592,622 A | 1/1997 | Isfeld et al. |
| 5,594,226 A | 1/1997 | Steger |
| 5,598,526 A | 1/1997 | Daniel et al. |
| 5,602,920 A | 2/1997 | Bestler et al. |
| 5,606,609 A | 2/1997 | Houser et al. |
| 5,611,575 A | 3/1997 | Petrie |
| 5,613,004 A | 3/1997 | Cooperman et al. |
| 5,613,012 A | 3/1997 | Hoffman et al. |
| 5,614,940 A | 3/1997 | Cobbley et al. |
| 5,617,119 A | 4/1997 | Briggs et al. |
| 5,617,148 A | 4/1997 | Montgomery |
| 5,629,770 A | 5/1997 | Brassil |
| 5,629,980 A | 5/1997 | Stefik et al. |
| 5,636,292 A | 6/1997 | Rhoads |
| 5,638,443 A | 6/1997 | Stefik |
| 5,638,446 A | 6/1997 | Rubin |
| 5,640,193 A | 6/1997 | Wellner |
| 5,646,999 A | 7/1997 | Saito |
| 5,652,626 A | 7/1997 | Kawakami et al. |
| 5,659,164 A | 8/1997 | Schmid |
| 5,661,574 A | 8/1997 | Kawana |
| 5,663,766 A | 9/1997 | Sizer, II |
| 5,664,018 A | 9/1997 | Leighton |
| 5,665,951 A | 9/1997 | Newman et al. |
| 5,666,487 A | 9/1997 | Goodman et al. |
| 5,668,636 A | 9/1997 | Beach et al. |
| 5,671,282 A | 9/1997 | Wolff et al. |
| 5,673,316 A | 9/1997 | Auerbach et al. |
| 5,687,236 A | 11/1997 | Moskowitz et al. |
| 5,692,073 A | 11/1997 | Cass |
| 5,710,636 A | 1/1998 | Curry |
| 5,717,940 A | 2/1998 | Peairs et al. |
| 5,719,939 A | 2/1998 | Tel |
| 5,721,788 A | 2/1998 | Powell et al. |
| 5,727,092 A | 3/1998 | Sandford, II et al. |
| 5,735,547 A | 4/1998 | Morelle et al. |
| 5,740,244 A | 4/1998 | Indeck et al. |
| 5,742,845 A | 4/1998 | Wagner |
| 5,745,604 A | 4/1998 | Rhoads |
| 5,754,308 A | 5/1998 | Lopresti et al. |
| 5,761,686 A | 6/1998 | Bloomberg |
| 5,765,152 A | 6/1998 | Erickson |
| 5,765,176 A | 6/1998 | Bloomberg |
| 5,768,426 A | 6/1998 | Rhoads |
| 5,778,102 A | 7/1998 | Sandford, II et al. |
| 5,790,693 A | 8/1998 | Graves et al. |
| 5,790,697 A | 8/1998 | Munro et al. |
| 5,804,803 A | 9/1998 | Cragun et al. |
| 5,809,160 A | 9/1998 | Powell et al. |
| 5,809,317 A | 9/1998 | Kogan et al. |
| 5,817,205 A | 10/1998 | Kaule |
| 5,818,441 A | 10/1998 | Throckmorton et al. |
| 5,819,289 A | 10/1998 | Sanford, II et al. |
| 5,825,871 A | 10/1998 | Mark |
| 5,825,892 A | 10/1998 | Braudaway et al. |
| 5,838,458 A | 11/1998 | Tsai |
| 5,841,978 A | 11/1998 | Rhoads |
| 5,848,144 A | 12/1998 | Ahrens |
| 5,848,413 A | 12/1998 | Wolff |
| 5,852,673 A | 12/1998 | Young |
| 5,857,038 A | 1/1999 | Owada et al. |
| 5,859,935 A | 1/1999 | Johnson et al. |
| 5,862,218 A | 1/1999 | Steinberg |
| 5,862,260 A | 1/1999 | Rhoads |
| 5,866,888 A | 2/1999 | Bravman et al. |
| 5,869,819 A | 2/1999 | Knowles et al. |
| 5,871,615 A | 2/1999 | Harris |
| 5,872,589 A | 2/1999 | Morales |
| 5,875,249 A | 2/1999 | Mintzer et al. |
| 5,878,434 A | 3/1999 | Draper et al. |
| 5,892,900 A | 4/1999 | Ginter et al. |
| 5,893,101 A | 4/1999 | Balogh et al. |
| 5,893,908 A | 4/1999 | Cullen et al. |
| 5,898,779 A | 4/1999 | Squilla et al. |
| 5,900,608 A | 5/1999 | Iida |
| 5,901,224 A | 5/1999 | Hecht |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,905,810 A | 5/1999 | Jones et al. |

| | | | | | | |
|---|---|---|---|---|---|---|
| 5,913,210 A | 6/1999 | Call | | 6,580,819 B1 | 6/2003 | Rhoads |
| 5,915,027 A | 6/1999 | Cox et al. | | 6,600,571 B1 | 7/2003 | Ito |
| 5,930,767 A | 7/1999 | Reber et al. | | 6,668,068 B2 | 12/2003 | Hashimoto |
| 5,932,862 A | 8/1999 | Hussey et al. | | 6,786,397 B2 | 9/2004 | Silverbrook et al. |
| 5,932,863 A | 8/1999 | Rathus et al. | | 6,804,376 B2 | 10/2004 | Rhoads et al. |
| 5,933,798 A | 8/1999 | Linnartz | | 6,829,368 B2 | 12/2004 | Meyer et al. |
| 5,933,829 A | 8/1999 | Durst et al. | | 6,917,691 B2 | 7/2005 | Evans et al. |
| 5,938,726 A | 8/1999 | Reber et al. | | 7,159,116 B2 * | 1/2007 | Moskowitz ................. 713/176 |
| 5,938,727 A | 8/1999 | Ikeda | | 7,171,018 B2 | 1/2007 | Rhoads et al. |
| 5,939,695 A | 8/1999 | Nelson | | 7,209,573 B2 | 4/2007 | Evans et al. |
| 5,940,595 A | 8/1999 | Reber et al. | | 7,362,879 B2 | 4/2008 | Evans et al. |
| 5,943,422 A | 8/1999 | Van Wie et al. | | 7,505,605 B2 | 3/2009 | Rhoads et al. |
| 5,946,414 A | 8/1999 | Cass et al. | | 2001/0016852 A1 | 8/2001 | Peairs et al. |
| 5,949,055 A | 9/1999 | Fleet et al. | | 2001/0017709 A1 | 8/2001 | Murakami et al. |
| 5,949,885 A | 9/1999 | Leighton | | 2001/0022667 A1 | 9/2001 | Yoda |
| 5,950,173 A | 9/1999 | Perkowski | | 2001/0024510 A1 | 9/2001 | Iwamura |
| 5,963,916 A | 10/1999 | Kaplan | | 2001/0026377 A1 | 10/2001 | Ikegami |
| 5,971,277 A | 10/1999 | Cragun et al. | | 2001/0026629 A1 | 10/2001 | Oki |
| 5,974,141 A | 10/1999 | Saito | | 2001/0028725 A1 | 10/2001 | Nakagawa |
| 5,974,548 A | 10/1999 | Adams | | 2001/0028727 A1 | 10/2001 | Naito et al. |
| 5,978,477 A | 11/1999 | Hull et al. | | 2001/0030759 A1 | 10/2001 | Hayashi et al. |
| 5,978,773 A | 11/1999 | Hudetz et al. | | 2001/0031066 A1 | 10/2001 | Meyer et al. |
| 5,979,757 A | 11/1999 | Tracy et al. | | 2001/0043362 A1 | 11/2001 | Hull et al. |
| 5,982,956 A | 11/1999 | Lahmi | | 2001/0053299 A1 | 12/2001 | Matsunoshita et al. |
| 5,983,218 A | 11/1999 | Syeda-Mahmoo | | 2002/0001095 A1 | 1/2002 | Kawakami et al. |
| 5,986,651 A | 11/1999 | Reber et al. | | 2002/0003891 A1 | 1/2002 | Hoshino |
| 5,991,426 A | 11/1999 | Cox et al. | | 2002/0009208 A1 | 1/2002 | Alattar et al. |
| 5,995,105 A | 11/1999 | Reber et al. | | 2002/0010684 A1 | 1/2002 | Moskowitz |
| 5,995,978 A | 11/1999 | Cullen et al. | | 2002/0018228 A1 | 2/2002 | Torigoe |
| 6,005,501 A | 12/1999 | Wolosewicz | | 2002/0023148 A1 | 2/2002 | Ritz |
| 6,006,226 A | 12/1999 | Cullen et al. | | 2002/0027994 A1 | 3/2002 | Katayama |
| 6,024,287 A | 2/2000 | Takai et al. | | 2002/0037091 A1 | 3/2002 | Terasaki |
| 6,035,177 A | 3/2000 | Moses et al. | | 2002/0040323 A1 | 4/2002 | Lee |
| 6,052,486 A | 4/2000 | Knowlton et al. | | 2002/0049580 A1 | 4/2002 | Kutaragi |
| 6,064,764 A | 5/2000 | Bhaskaran et al. | | 2002/0051237 A1 | 5/2002 | Ohara |
| 6,085,205 A | 7/2000 | Peairs et al. | | 2002/0059384 A1 | 5/2002 | Kaars |
| 6,122,403 A | 9/2000 | Rhoads | | 2002/0071556 A1 | 6/2002 | Moskowitz |
| 6,166,750 A | 12/2000 | Negishi | | 2002/0073319 A1 | 6/2002 | Manabe |
| 6,182,090 B1 | 1/2001 | Peairs | | 2002/0075298 A1 | 6/2002 | Schena |
| 6,188,787 B1 | 2/2001 | Ohmae et al. | | 2002/0080396 A1 | 6/2002 | Silverbrook |
| 6,199,073 B1 | 3/2001 | Peairs et al. | | 2002/0080964 A1 | 6/2002 | Stone |
| 6,243,480 B1 | 6/2001 | Zhao et al. | | 2002/0120515 A1 | 8/2002 | Morimoto |
| 6,252,963 B1 | 6/2001 | Rhoads | | 2002/0126762 A1 | 9/2002 | Tanaka |
| 6,266,430 B1 | 7/2001 | Rhoads | | 2002/0154778 A1 | 10/2002 | Mihcak |
| 6,286,036 B1 | 9/2001 | Rhoads | | 2002/0165793 A1 | 11/2002 | Brand |
| 6,301,360 B1 | 10/2001 | Bocionek et al. | | 2003/0069852 A1 | 4/2003 | Bryant |
| 6,311,214 B1 | 10/2001 | Rhoads | | 2003/0077096 A1 | 4/2003 | Potter |
| 6,314,457 B1 | 11/2001 | Schena | | 2004/0148408 A1 | 7/2004 | Nadarajah |
| 6,321,648 B1 | 11/2001 | Berson et al. | | | | |
| 6,321,981 B1 | 11/2001 | Ray et al. | | FOREIGN PATENT DOCUMENTS | | |
| 6,324,573 B1 | 11/2001 | Rhoads | | EP | 411 232 | 2/1991 |
| 6,324,574 B1 | 11/2001 | Gong | | EP | 418 964 | 3/1991 |
| 6,334,721 B1 | 1/2002 | Horigane | | EP | 441 702 | 8/1991 |
| 6,343,138 B1 | 1/2002 | Rhoads | | EP | 493 091 | 7/1992 |
| 6,343,204 B1 | 1/2002 | Yang | | EP | 058 482 | 8/1992 |
| 6,345,104 B1 | 2/2002 | Rhoads | | EP | 551 016 | 7/1993 |
| 6,351,815 B1 | 2/2002 | Adams | | EP | 518 317 | 2/1994 |
| 6,359,985 B1 | 3/2002 | Koch et al. | | EP | 605 208 | 7/1994 |
| 6,366,685 B1 | 4/2002 | Terasaki | | EP | 649 074 | 4/1995 |
| 6,427,020 B1 | 7/2002 | Rhoads | | EP | 705 025 | 4/1996 |
| 6,439,465 B1 | 8/2002 | Bloomberg | | EP | 711061 | 5/1996 |
| 6,445,468 B1 | 9/2002 | Tsai | | EP | 0789480 | 8/1997 |
| 6,449,377 B1 | 9/2002 | Rhoads | | EP | 872995 | 10/1998 |
| 6,466,329 B1 | 10/2002 | Mukai | | EP | 0642060 | 4/1999 |
| 6,490,681 B1 | 12/2002 | Kobayashi et al. | | EP | 975147 | 1/2000 |
| 6,505,160 B1 | 1/2003 | Levy et al. | | EP | 1122939 | 8/2001 |
| 6,512,837 B1 | 1/2003 | Ahmed | | EP | 1147495 | 10/2001 |
| 6,515,755 B1 | 2/2003 | Hasegawa | | GB | 2063018 | 5/1981 |
| 6,522,770 B1 | 2/2003 | Seder et al. | | GB | 2067871 | 7/1981 |
| 6,522,771 B2 | 2/2003 | Rhoads | | GB | 2196167 | 4/1988 |
| 6,549,638 B2 | 4/2003 | Davis et al. | | GB | 2204984 | 11/1988 |
| 6,574,350 B2 | 6/2003 | Rhoads et al. | | GB | 2344482 | 6/2000 |
| 6,577,746 B1 | 6/2003 | Evans et al. | | | | |

| GB | 2346110 | 8/2000 |
| JP | 4-248771 | 2/1992 |
| JP | 5/242217 | 9/1993 |
| JP | 8-30759 | 2/1996 |
| JP | 08-50598 | 2/1996 |
| WO | WO 89/08915 | 9/1989 |
| WO | WO 93/25038 | 12/1993 |
| WO | WO94/27228 | 11/1994 |
| WO | WO95/04665 | 2/1995 |
| WO | WO95/10813 | 2/1995 |
| WO | WO 95/10835 | 4/1995 |
| WO | WO 95/14289 | 5/1995 |
| WO | WO 95/20291 | 7/1995 |
| WO | WO 96/26494 | 8/1996 |
| WO | WO 96/27259 | 9/1996 |
| WO | WO97/43736 | 11/1997 |
| WO | WO98/14887 | 4/1998 |
| WO | 98/20411 | 5/1998 |
| WO | WO 98/20411 | 5/1998 |
| WO | WO98/20642 | 5/1998 |
| WO | WO98/24050 | 6/1998 |
| WO | WO98/40823 | 9/1998 |
| WO | WO98/49813 | 11/1998 |
| WO | WO99/34277 | 7/1999 |
| WO | WO99/36876 | 7/1999 |
| WO | WO00/44131 | 7/2000 |
| WO | WO 01/08405 | 2/2001 |
| WO | WO 01/80169 | 10/2001 |
| WO | WO 02/03385 | 1/2002 |
| WO | WO 0239719 | 5/2002 |

OTHER PUBLICATIONS

Zhao et al., "Embedding Robust Labels Into Images for Copyright Protection," Proc. of the International Congress on Intellectual Property Rights for Specialized Information, Knowledge and New Technologies (Vienna, Austria) Aug. 21-25, 1995, 10 pages.
Bender, "Applications for Data Hiding," IBM Systems Journal, vol. 39, No. 3-4, pp. 547-568, 2000.
Gruhl et al., "Information Hiding to Foil the Casual Counterfeiter," Proc. 2d Information Hiding Workshop, LNCS vol. 1525, pp. 1-15 (Apr. 15, 1998).
Simmons, "Subliminal Channels; Past and Present," ETT, vol. 5, No. 4, Jul.-Aug. 1994, pp. 45-59.
Sheng et al., "Experiments on Pattern Recognition Using Invariant Fourier-Mellin Descriptors," Journal of Optical Society of America, vol. 3, No. 6, Jun. 1986, pp. 771-776.
Sklar, "A Structured Overview of Digital Communications—a Tutorial Review—Part I," IEEE Communications Magazine, Aug. 1983, pp. 1-17.
Sklar, "A Structured Overview of Digital Communications—a Tutorial Review—Part II," IEEE Communications Magazine, Oct. 1983, pp. 6-21.
"Steganography," Intellectual Property and the National Information Infrastructure The Report of the Working Group on Intellectual Property Rights, Sep. 1995, pp. 212-213.
Tanaka et al., "Embedding Secret Information Into a Dithered Multi-Level Image," Proc IEEE Military Comm Conf., Sep. 1990, pp. 216-220.
Tanaka, "Embedding the Attribute Information Into a Dithered Image," Systems and Computers in Japan, vol. 21, No. 7, 1990, pp. 43-50.
Tirkel et al., "A Two-Dimensional Digital Watermark," 1995, 6 pages.
Toga et al., "Registration Revisited," Journal of Neuroscience Methods, 48 (1993), pp. 1-13.
van Schyndel et al., "Towards a Robust Digital Watermark," ACCV '95, vol. 2, Dec. 1995, pp. 504-508.
Wagner, "Fingerprinting," 1983 IEEE, pp. 18-22.
Walton, "Image Authentication for a Slippery New Age," Dr. Dobb's Journal, Apr. 1995, pp. 18-26, 82-87.
Wise, "The History of Copyright, Photographers' Rights Span Three Centuries," Photo>Electronic Imaging, vol. 37, No. 6, 1994.

"Access Control and COpyright Protection for Images, WorkPackage 8: Watermarking," Jun. 30, 1995, 46 pages.
"Access Control and COpyright Protection for Images, WorkPackage 3: Evaluation of Existing Systems," Apr. 19, 1995, 68 pages.
"Access Control and COpyright Protection for Images, WorkPackage 1: Access Control and Copyright Protection for Images Need Evaluation," Jun. 1995, 21 pages.
Arachelian, "White Noise Storm," Apr. 11, 1994, Internet reference, 13 pages.
Arazi, et al., "Intuition, Perception, and Secure Communication," IEEE Transactionson Systems, Man, and Cybernetics, vol. 19, No. 5, Sep./Oct. 1989, pp. 1016-1020.
Arthur, "Digital Fingerprints Protect Artwork," New Scientist, Nov. 12, 1994, p. 24.
Aura, "Invisible Communication," Helskinki University of Technology, Digital Systems Laboratory, Nov. 5, 1995, 13 pages.
Bender et al, "Techniques for Data Hiding," Draft Preprint, Private Correspondence, dated Oct. 30, 1995.
Bender et al., "Techniques for Data Hiding," Massachusetts Institute of Technology, Media Laboratory, Jan. 1995, 10 pages.
Boneh, "Collusion-Secure Fingerprinting for Digial Data," Department of Computer Science, Princeton University, 1995, 31 pages.
Boney et al., "Digital Watermarks for Audio Signals," Proceedings of Multimedia '96, 1996 IEEE, pp. 473-480.
Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov. 1995; published 1996, pp. 229-243.
Brassil et al., "Hiding Information in Document Images," Nov. 1995, 7 pages.
Brown, "S-Tools for Windows, Version 1.00, .COPYRGT. 1994 Andy Brown, What is Steganography," Internet reference, Mar. 6, 1994, 6 pages.
Bruyndonckx et al., Neural Network Post-Processing of Coded Images Using Perceptual Masking, 1994, 3 pages.
Bruyndonckx et al., "Spatial Method for Copyright Labeling of Digital Images," 1994, 6 pages.
Burgett et al., "A Novel Method for Copyright Labeling Digitized Image Data," requested by email from author (unavailable/password protected on IGD WWW site); received Sep. 18, 1995, 12 pages.
Caronni, "Assuring Ownership Rights for Digital Images," Published in the Proceedings of Reliable IT Systems, VIS '95, HH. Bruggemann and W. Gerhardt-Hackl (Ed.), Vieweg Publishing Company, Germany, 1995, Jun. 14, 1994, 10 pages.
Caruso, "Digital Commerce, 2 plans for watermarks, which can bind proof of authorship to electronic works." New York Times, Aug. 7, 1995, one page.
Choudhury, et al., "Copyright Protection for Electronic Publishing over Computer Networks," IEEE Network Magazine, Jun. 1994, 18 pages.
Clarke, "Invisible Code Tags Electronic Images,"0 Electronic Engineering Times, Jun. 12, 1995, n. 852, p. 42.
"Copyright Protection for Digital Images, Digital Fingerprinting from FBI," Highwater FBI brochure, 1995, 4 pages.
Cox et al., "Secure Spread Spectrum Watermarking for Multimedia," NEC Research Institute Technical Report, Dec. 5, 1995, 33 pages.
Cox et al., "A Secure, Imperceptable Yet Perceptually Salient, Spread Spectrum Watermark for Multimedia," IEEE, Southcon/96, Conference Record, pp. 192-197, 1996.
"Cyphertech Systems: Introduces Digital Encoding Device to Prevent TV Piracy," Hollywood Reporter, Oct. 20, 1993, p. 23.
JPEG Group's JPEG Sofware (release 4), ftp.csua.berekeley.edu/pub/cypherpunks/applications/jsteg/jpeg. announcement.gz. . Kassam, Signal Detection in Non-Gaussian Noise, Dowden & Culver, 1988, pp. 1-96.
Johhnson, "Steganography," Dec. 1995, 32 pages.
"Holographic signatures for digital images," The Seybold Report on Desktop Publishing, Aug. 1995, one page.
Delaigle et al., "Digital Watermarking," Proc. SPIE—Int. Soc. Opt. Eng., vol. 2659, pp. 99-110, 1996.
Delaigle et al., "A Psychovisual Approach for Digital Picture Watermarking," 1995, 20 pages.

Digimarc presentation at RSA Conference, approximately Jan. 17, 1996, 4 pages.

Fitzgerald, "Invisible Digital Copyright ID," Editor & Publisher, Jun. 25, 1994, p. 62.

"Foiling Card Forgers With Magnetic Noise," Wall Street Journal, Feb. 8, 1994.

Frequently Asked Questions About Digimarc Signature Technology, Aug. 1, 1995, http://www.digimarc.com, 9 pages.

Friedman, "The Trustworthy Digital Camera: Restoring Credibility to the Photographic Image," IEEE Transactions on Consumer Electronics, vol. 39, No. 4, Nov. 1993, pp. 905-910.

Hartung et al., Digital Watermarking of Raw and Compressed Video, Proc. SPIE 2952, Digital Compression Technologies and Systems for Video Communications, Oct. 1996, pp. 205-213.

Hecht, "Embedded Data Glyph Technology for Hardcopy Digital Documents," SPIE vol. 2171, Feb. 1994, pp. 341-352.

Koch et al., "Digital Copyright Labeling: Providing Evidence of Misuse and Tracking Unauthorized Distribution of Copyright Materials," Oasis Magazine, Dec. 1995, 3 pages.

Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944-957.

Matthews, "When Seeing is Not Believing," New Scientist, Oct. 16, 1993, pp. 13-15.

Matsui et al., "Video-Steganography: How to Secretly Embed a Signature in a Picture," IMA Intellectual Property Project Proceedings, Jan. 1994, vol. 1, Issue 1, pp. 187-205.

Moller, et al., "Rechnergestutzte Steganographie: Wie sie Funktioniert und warum folglich jede Reglementierung von Verschlusselung unsinnig ist," DuD, Datenschutz und Datensicherung, Jun. 18, 1994, 318-326.

"NAB—Cyphertech Starts Anti-Piracy Broadcast Tests," Newsbytes, NEW03230023, Mar. 23, 1994.

Nakamura et al., "A Unified Coding Method of Image and Text Data Using Discrete Orthogonal Transform," Systems and Computers in Japan, vol. 21, No. 3, 1990, pp. 87-92.

Nakamura et al., "A Unified Coding Method of Dithered Image and Text Data Using Micropatterns," Electronics and Communications in Japan, Part 1, vol. 72, No. 4, 1989, pp. 50-56.

New Product Information, "FBI at AppleExpo" (Olympia, London), Nov. 1995, 2 pages.

Ohnishi et al., Embedding a Seal into a Picture Under Orthogonal Wavelet Transform, Proceedings of Multimedia '96, 1996, IEEE, pp. 514-421.

ORuanaidh et al, "Watermarking Digital Images for Copyright Protection," http://www.kalman.mee.tcd.ie/people/jjr/eva.sub.—pap.html, Feb. 2, 1996, 8 pages. (Also published Aug. 1996, IEE Proceedings—Vision, Image and Signal Processing, vol. 143, No. 4, pp. 250-256.).

Pennebaker et al., JPEG Still Image Data Compression Standard, Chapter 3, "Aspects of the Human Visual System," pp. 23-27, 1993, Van Nostrand Reinhold, New York.

Pickholtz et al., "Theory of Spread-Spectrum Communications—A Tutorial," Transactions on Communications, vol. COM-30, No. 5, May 1982, pp. 855-884.

Pitas et al., "Applying Signatures on Digital Images," IEEE Workshop on Nonlinear Image and Signal Processing, Neos Marmaras, Greece, pp. 460-463, Jun. 1995.

Port, "Halting Highway Robbery on the Internet," Business Week, Oct. 17, 1994, p. 212.

Sapwater et al., "Electronic Copyright Protection," Photo>Electronic Imaging, vol. 37, No. 6, 1994, pp. 16-21.

Schneier, "Digital Signatures, Cryptographic Algorithms Can Create Nonforgeable Signatures for Electronic Documents, Making Them Valid Legal Instruments" BYTE, Nov. 1993, pp. 309-312.

Shaggy@phantom.com, "Hide and Seek v. 40," Internet reference, Apr. 10, 1994, 3 pages.

Short, "Steps Toward Unmasking Secure Communications," International Journal of Bifurcation and Chaos, vol. 4, 1994, pp. 959-977.

Audio Watermarking Architectures for Secure Digital Music Distribution, A Proposal to the SDMI Portable Devices Working Group by ARIS Technologies, Inc, Mar. 26, 1999, pp. 1-11.

Audio Watermarking Architectures for Persistent Protection, Presentation to SDMI PDWG, Mar. 29, 1999, J. Winograd, Aris Technologies, pp. 1-16.

Audio Watermarking System to Screen Digital Audio Content for LCM Acceptance, A Proposal Submitted in Response to PDWG99050504—Transition CfP by ARIS Technologies, Inc., May 23, 1999, Document Version 1.0, 15 pages.

Boland et al., "Watermarking Digital Images for Copyright Protection", Fifth Int'l Conference on Image Processing and it's Application, Jul. 1995, pp. 326-330.

Levy, "AIPL's Proposal for SDMI: An Underlying Security System" (slide presentation), Mar. 29, 1999, 23 slides.

Microsoft Response to CfP for Technology Solutions to Screen Digital Audio Content for LCM Acceptance, SDMI, PDWG Tokyo, May 23, 1999, 9 pages.

Sandford II et al., "The Data Embedding Method", Proceedings of the SPIE vol. 2615, pp. 226-259, 1996.

Thomas, Keith, Screening Technology for Content from Compact Discs, May 24, 1999, 11 pages.

Vidal et al., "Non-Noticeable Information Embedding in Color Images:Marking and Detection", IEEE 1999, pp. 293-297.

Wolfgang et al., "A Watermark for Digital Images," Computer Vision and Image Processing Laboratory, Purdue University, Sep. 1996, pp. 219-222.

Cookson, Chris, General Principles of Music Uses on Portable Devices, presented to SDMI, Mar. 5, 1999.

Winograd, J.M., "Audio Watermarking Architecture for Secure Digital Music Distribution," a Proposal to the SDMI Portable Devices Working Group, by Aris Technologies, Inc., Mar. 26, 1999.

Mintzer et al., "Safeguarding Digital Library Contents and Users: Digital Watermarking," D-Lib Magazine, Dec. 1997, 12 pages.

Szepanski, "A Signal Theoretic Method for Creating Forgery-Proof Documents for Automatic Verification," Proceedings 1979 Carnahan Conference on Crime Countermeasures, May 16, 1979, pp. 101-109.

Dautzenberg, "Watermarking Images," Department of Microelectronics and Electrical Engineering, Trinity College Dublin, 47 pages, Oct. 1994.

Tirkel et al. "Electronic Water Mark," DICTA-93, Macquarie University, Sydney, Australia, Dec. 1993, pp. 666-673.

Weber et al., "Correlative Image Registration," Seminars in Nuclear Medicine, vol. XXIV, No. 4; Oct. 1994, pp. 311-323.

Brassil et al., Electronic Marking and Identification Techniques to Discourage Document Copying, Proceedings of INFOCOM '94 Conference on Computer, IEEE Commun Soc. Conference, Jun. 12-16, 1994, 1278-1287.

Bruckstein, A.M.; Richardson, T.J., A holographic transform domain image watermarking method, Circuits, Systems, and Signal Processing vol. 17, No. 3 p. 361-89, 1998, This paper includes an appendix containing an internal memo of Bell Labs, which according to the authors of the paper, was dated Sep. 1994.

"High Water FBI Limited Presentation Image Copying Protection Software," FBI Ltd brochure, Jul. 1995, 17 pages.

Koch et al., "Copyright Protection for Multimedia Data," Fraunhofer Insitute for Computer Graphics, Dec. 16, 1994, 15 pages.

Koch et al., "Towards Robust and Hidden Images Copyright Labeling," Proc. of 1995 IEEE Workshop on Nonlinear Signal and Image Processing, Jun. 20-22, 1995, 4 pages.

Kurak et al., "A Cautionary Note on Image Downgrading," 1992 IEEE, pp. 153-159.

Mintzer et al., "Safeguarding Digital library Contents and Users" Digital Watermarking D-Lib Magazine, Dec. 1997: ISSN 1082-9873.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Schreiber et al., "A Compatible High-Definition Television System Using the Noise-Margin Method of Hiding Enhancement Information," SMPTE Journal, Dec. 1989, pp. 873-879.

SDMI Examples Use Scenarios (Non-Exhaustive), Version 1.2, Jun. 16, 1999.

Szepanski, "Additive Binary Data Transmission for Video Signals," Papers Presented at Conf. Of Comm Engineering Soc. Sep. 30-Oct. 3, 1980, Technical Reports vol. 74, pp. 342-352.

Tanaka et al., "A Visual Retrieval System with Private Information for Image Database," Proceeding International Conference on DSP Applications and Technology, Oct. 1991, pp. 415-421.

Tanaka et al., "New Integrated Coding Schemes for Computer-Aided Facsimile," Proc IEEE Int'l Conf. on Sys. Integration, Apr. 1990, pp. 275-281.

Peairs, "Iconic Paper," Proceeedings of the Third International Conference of Document.

Bloomberg, "Embedding Digital Data on Paper in Iconic Text" SPIE vol. 3027, Document Recognition IV, pp. 67-80 (1997).

Johnson, et al., "Bridging the Paper and Electronic Worlds: The Paper User Interface", Interchi '93, pp. 507-512, Apr. 1993.

Newman, William, et al., "A Desk Supporting Computer-Based Interaction with paper Documents," ACM Conference on Human Factors in Computing Systems (CHI '92) May 3-7, 1992, pp. 587-592.

Rao, et al., "Protofoil: Storing and Finding the Information Worker's Paper Documents in an Electronic File Cabinet," Human Factors in Computing Systems (CHI '94), pp. 180-186, Boston, MA, Apr. 1994.

Whittaker, et al., "Back to the Future: Pen and Paper Technology Supports Complex Group Coordination," CHI '95, Conference on Human Factors in Computing Systems, Denver, Colorado (May 7-11, 1995) (text obtained from ACM).

Zhao, "A. WWW Service to Embed and Prove Digital Copyright Watermarks," Fraunhofer Institute for Computer Graphics, Proc. of EU Conf. on Multimedia Applications, Services and Techniques, May 1996, 15 pages.

* cited by examiner

SUBSTITUTING OR REPLACING COMPONENTS IN MEDIA OBJECTS BASED ON STEGANOGRAPHIC ENCODING

RELATED APPLICATION DATA

This application is a continuation of U.S. patent Ser. No. 11/739,534, filed Apr. 24, 2007 (U.S. Pat. No. 7,362,879), which is a continuation of U.S. patent application Ser. No. 11/145,515, filed Jun. 3, 2005 (U.S. Pat. No. 7,209,573), which is a continuation of U.S. patent application Ser. No. 10/448,544, filed May 29, 2003 (U.S. Pat. No. 6,917,691), which is a continuation of U.S. patent application Ser. No. 09/473,396, filed Dec. 28, 1999 (U.S. Pat. No. 6,577,746). Each of these patent documents is hereby incorporated by reference.

FIELD OF THE INVENTION

The present invention relates to data processing, and more particularly relates to use of watermark technology for object substitution.

BACKGROUND AND SUMMARY OF THE INVENTION

Object linking and embedding ("OLE," sometimes also known as dynamic data exchange, or "DDE") is a well-known data processing construct by which a first digital object (e.g., a graph) can be embedded within a second digital object (e.g., a word processing document). In some embodiments, the embedding is static. That is, once the embedding takes place, subsequent changes to the first digital object (e.g., the graph) are not reflected in the second, composite digital object (e.g., the document). In other embodiments, the embedding is dynamic (and thus more commonly termed linking rather than embedding). In such arrangements, if the graph is changed, the document is automatically updated to incorporate the latest version of the graph.

The technology underlying OLE is sophisticated, but is well understood by artisans in the field. Reference may be made to the many patents (e.g., U.S. Pat. Nos. 5,581,760 and 5,581,686) and reference books (e.g., Brockschmidt, *Inside OLE 2*, Microsoft Press, Redmond, Wash., 1994) on the subject for further details.

In accordance with the present invention, OLE-like principles are implemented using watermark data in digital objects in order to effect object linking or embedding.

In one illustrative embodiment, a photocopier scans an original paper document to produce image data. This image data is analyzed for the presence of watermark data that identifies the graphic(s) on the document. With this watermark identifier, the photocopier can query a remote image database for pristine image data corresponding to the graphic(s) on the document. This pristine data can be relayed from the remote database to the photocopier and substituted into the scanned image data. Output printed from the photocopier is thus based, at least in part, on pristine image data, rather than on image data that has been subjected to various corruption mechanisms (e.g., degradation of the original paper document, artifacts due to scanning, etc.).

The foregoing and other features and advantages of the present invention will be more readily apparent from the following detailed description, which proceeds with reference to the accompanying drawings.

DETAILED DESCRIPTION

Figure 1:
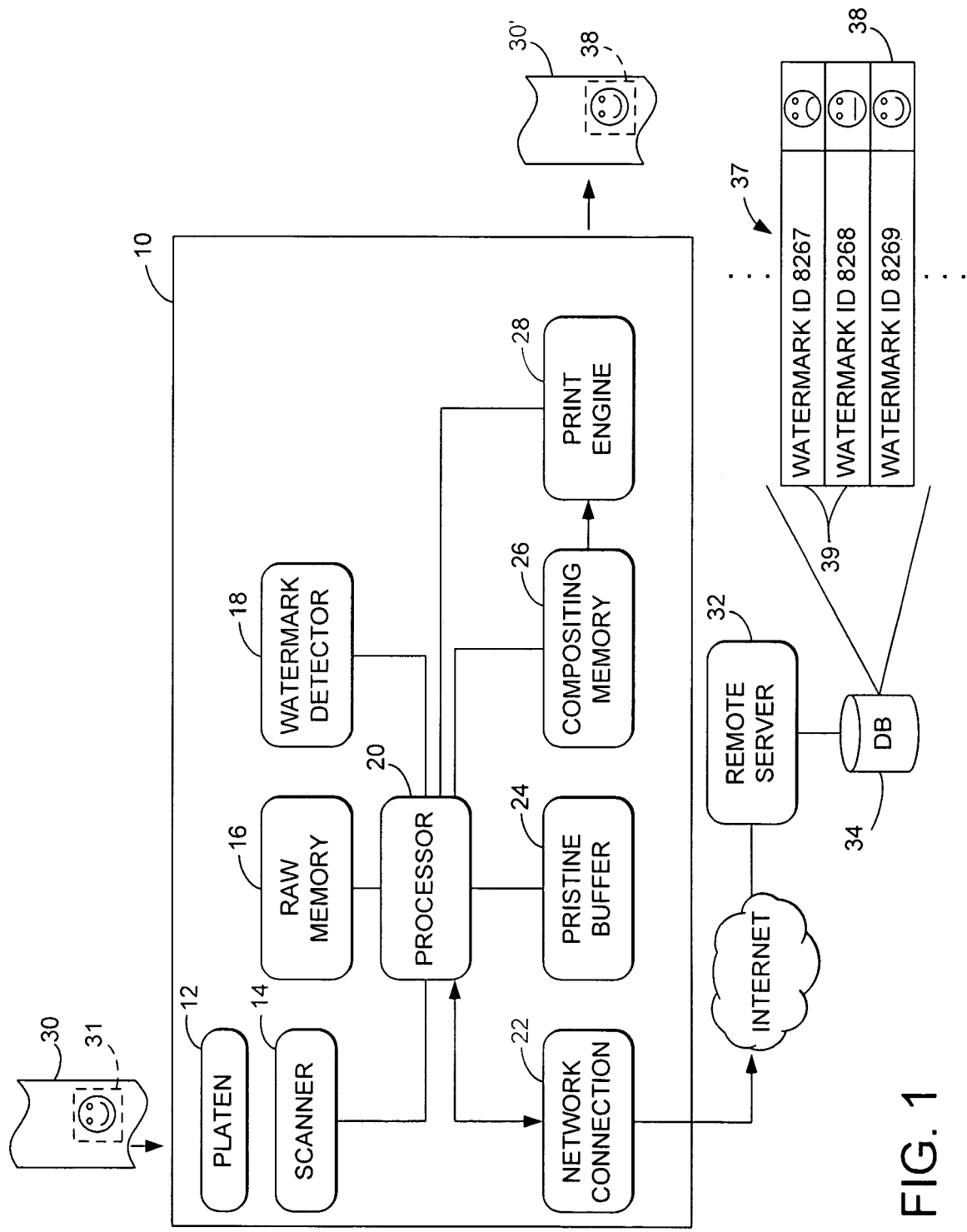
FIG. 1 shows an apparatus according to one embodiment of the present invention.

Referring to FIG. 1, an illustrative embodiment of the present invention is a photocopier 10. The photocopier includes a platen 12, a scanner assembly 14, a raw data memory 16, a watermark decoder 18, a processor 20, a network connection 22, a pristine image buffer 24, a compositing memory 26, and a reproduction engine 28.

A paper document, such as document 30, is placed on platen 12, and scanner assembly 14 is activated to generate scan data corresponding to the document. The scanner assembly is conventional and may include a linear array of CCD or CMOS sensor elements that optically scans along an axis of the platen to generate 2D image data. Alternatively, the scanner can comprise a 2D array of sensor elements onto which an image of the document is projected through one or more lenses. In the illustrated embodiment, the document 30 includes a picture 31 that is encoded with a plural-bit digital watermark. Document 30 may be referred to as a compound document since it incorporates plural components (e.g., text and picture).

The scan data from the scanner assembly 14 is stored in the raw data memory 16, where it is analyzed for the presence of watermark data by the watermark decoder 18.

There are many different techniques by which imagery can be digitally watermarked and decoded. One is the Digimarc watermark system detailed, e.g., in U.S. Pat. No. 5,862,260, and in pending application Ser. No. 09/452,023, filed Nov. 30, 1999 (now U.S. Pat. No. 6,408,082), the disclosures of which are incorporated herein by reference. A great variety of other systems are known. All that is required is that the watermark permit the conveyance of plural-bit auxiliary data without objectionable image degradation.

Upon detection of the watermark in picture 31, the processor 20 is programmed to initiate communication with a remote server 32 (e.g., over the internet) through the network connection 22. The programmed processor sends to the server a query message identifying the detected watermark (which may be, e.g., an identifier of 16-64 bits). A database 34 at the server 32 searches its records 37 for a digital object indexed by that watermark ID 39 and, if located, causes a pristine version of the object 38 (in this case a pristine version of the picture 31) to be sent to the photocopier.

In the embodiment illustrated, the database has the pristine version of the object stored within the database record for that watermark ID, and relays same directly back to the photocopier. In other embodiments, the object itself is not stored in the database. Instead, the database stores (in a record associated with the watermark ID) the address of a remote data repository at which the pristine object is stored. In this case the object server 32 can transmit an instruction to the remote repository (e.g., again over the internet), requesting the remote repository to provide the pristine object. The object can be sent directly from the remote data repository to the photocopier, or may be relayed through the object server 32. In any case, the pristine object may be provided in TIFF, JPEG, GIF, or other format. (In some embodiment, the request signal from the photocopier specifies the format desired, or may specify plural formats that the photocopier can accept, and the pristine object is then output by the server 32 or remote repository in such a format. In other embodiments, the request signal from the photocopier does not include any format data.)

In some embodiments, the object server 32 can be of the sort more particularly detailed in copending applications 60/164,619 (filed Nov. 10, 1999), and Ser. No. 09/343,104 (filed Jun. 29, 1999), the disclosures of which are incorporated herein by reference.

In addition to detecting the ID of any watermark in the scanned image data, the photocopier's watermark detector also discerns the placement of the watermarked picture within the document image, and its state (e.g., size, rotation, etc.), and produces corresponding state information. In some embodiments, this state information is passed to the object server 32, permitting the pristine object 38 to be sized/rotated/etc. (e.g., by the object server) to match the object detected in the document image. In other embodiments, a generic version of the pristine object is passed back to the photocopier, and the processor 20 attends to sizing, rotating, etc., of the pristine picture 38 as necessary to match that of the original picture 31.

In some embodiments the picture 31 in the paper document has been cropped. (The watermark can nonetheless be detected from the cropped image.) When the pristine picture 38 is received from the remote location, it can be pattern-matched to the picture 31 detected in the original document to determine the cropping boundaries (if any), and corresponding cropping of the pristine picture can be effected.

Once the foregoing scaling/rotation/cropping, etc., adjustments (if any) have been made on the pristine picture 38 stored in buffer 24, the processed pristine picture is combined with the original document scan data in compositing memory 26, yielding a composite document image that includes the pristine picture data 38 in lieu of the scanned picture 31. (The substitution of the pristine picture for the original picture data can be accomplished by various known image processing techniques, including masking, overwriting, etc.) The composite document image is then passed to the reproduction engine 28 to produce a hard-copy output (i.e., an enhanced compound document 30') in the conventional manner. (The reprographic engine 28 can take many different forms including, e.g., xerography, ink-jet printing, etc.)

The pristine picture 38 received from the server 32 can, itself, be watermarked or not. If watermarked, the watermark will usually convey the same payload information as the watermark in the original picture 31, although this need not always be the case. In other embodiments, the pristine picture 38 received from the remote server 32 has no watermark. In such case the pristine picture can be substituted into the compound document 30 in its unwatermarked state. Alternatively, the apparatus 10 can embed a watermark into the picture prior to (or as part of) the substitution operation.

If the substituted picture is watermarked, this permits later watermark-based enhancement or updating. For example, if the enhanced compound document 30' including the pristine picture 38 is printed by the photocopier, and the resulting photocopy is thereafter photocopied, the latter photocopying operation can again substitute pristine picture data for the scanned picture data produced by the second photocopier's scanner. Moreover, in applications where it is appropriate for a picture to be updated with the latest version whenever printed, the watermarking of the picture 38 permits substitution of a latest version whenever the document is scanned for printing.

In other situations, it is desirable for the picture 38 included in the enhanced compound document 30' to be unwatermarked. This is the case, for example, in certain archival applications where it is important that the document 30' not be changed after archiving. By assuring that the picture 38 is not watermarked, inadvertent changing of the picture in subsequent photocopying can be avoided. (In cases where the pristine image 38 is provided from server 32 in a watermarked state, the photocopier may remove or disable the watermark in response to corresponding instructions from a user through a user interface or the like.)

From the foregoing, it will be recognized that the illustrative embodiment can produce "photocopies" that are better than the "originals." This is accomplished by watermark-based substitution of pristine digital objects to replace less pristine counterparts.

Having described and illustrated the principles of our invention with reference to an illustrative embodiment, it will be recognized the invention is not so limited.

For example, while the invention is particularly illustrated with reference to a photocopier, the same principles are equally applicable in other systems, including personal computers (e.g., in conjunction with image editing software, such as Adobe Photoshop). In such case the input image data needn't come from a scanner but may come, e.g., from a digital file, from a network location, etc.

Likewise, while the invention is particularly illustrated with reference to picture (i.e., graphic) data, the same principles are equally applicable in connection with other data types, such as video, sound, text, etc. Moreover, the reference to "documents" is illustrative only; the invention can similarly be employed with any compound object that includes a watermarked component—whether in digital or analog form.

While the detailed embodiment is described as using separate raw data memory 16, pristine image buffer 24, and compositing memory 26, more typically some or all of these functions are served by a single memory, which may be a computer system's main RAM memory.

Likewise, while the detailed embodiment employs a processor 20 programmed in accordance with software instructions (e.g., stored in a memory or on a storage medium), in other embodiments some or all of the described functionality can be achieved using dedicated hardware (e.g., ASICs), or programmable hardware (e.g., PLAs).

Still further, while the invention is illustrated with reference to an arrangement in which a document includes a single watermarked photograph, it will be recognized that plural such watermarked components may be present in a compound document, and the system may be arranged to obtain pristine versions of each, and edit/composite same as necessary as to recreate an enhanced version of the original document.

Moreover, while the illustrative embodiment contemplates that a watermarked photograph may be a component of the original document, in other embodiments the watermarked object may comprise the entirety of the original document.

While reference has been made to substitution of pristine image components, in some embodiments it may be desirable to substitute components that are not "pristine." Indeed, in some embodiments an object may be substituted that is visually dissimilar to the original object. Consider artwork for a Christmas card. The artwork may include a watermarked "generic" corporate logo. When encountered by a computer according to the present invention, the generic logo may be replaced with a logo corresponding to the corporate owner of the computer. In such case, the substitute imagery may be stored within the computer itself, obviating the need for any network connection. The registry database maintained by the computer's operating system may include keys defined by watermark IDs. When a watermark ID is encountered, the registry database can be consulted to identify a corresponding graphic that can be substituted into the object being processed. If none is found, the watermark ID can be passed to the remote server 32.

While, for expository convenience, the illustrative embodiment was described as always substituting pristine data when available, more typically this is a function that would be enabled or disabled by an operator of the device, e.g., by an appropriate switch, button, or user interface control. In some embodiments, the device may be arranged to query the user when substitution of a pristine component is possible, in some cases presenting the user with a depiction of the image component proposed to be substituted.

The illustrative embodiment may be said to employ watermark-based object embedding, since the hard-copy output is static (i.e., cannot change) after printing. In other embodiments, the enhanced compound document 30' is not printed, but stored. Each time the compound document is utilized (e.g., opened for editing, or printed), any watermarked component(s) therein can be updated to include the latest-available version(s) of the watermarked component(s). In such case, the document may be said to employ watermark-based object linking.

In view of the many embodiments to which the principles of our invention may be applied, it should be apparent that the detailed embodiment is illustrative only and should not be taken as limiting the scope of our invention. Rather, we claim as our invention all such modifications as may fall within the scope and spirit of the following claims, and equivalents thereto.

What is claimed is:

1. An apparatus comprising:
   an input to receive an identifier obtained from a steganographically encoded media object;
   an output to communicate: i) at least a portion of the identifier to a remote data repository, the remote data repository including at least a plurality of substitute media objects corresponding, respectively, to at least one of a plurality of identifiers, and ii) an instruction to the remote data repository, and
   a processor to control said apparatus.

2. The apparatus of claim 1 wherein the media object comprises audio or video.

3. The apparatus of claim 1 wherein the instruction comprises a format for which a substitute media object should be placed in prior to communication of the substitute media object to the apparatus.

4. The apparatus of claim 1 wherein the instruction comprises state information.

5. The apparatus of claim 1 wherein the instruction comprises a request for a substitute media object from the plurality of substitute media objects that corresponds to the identifier.

6. The apparatus of claim 1 wherein the instruction further comprises a request to provide a substitute media object corresponding to the identifier directly to a remotely located consumer device.

7. An apparatus comprising:
   a processor; and
   memory, said memory comprising instructions for execution by said processor, said instructions comprising instructions to:
   upon receipt of a copy request, determine whether an object to be copied comprises a steganographic signal hidden within at least one component of the object,
   if the object comprises a steganographic signal hidden therein, obtain a substitute or replacement component corresponding to the steganographic signal, and
   execute the copy request of the object to yield a copy object including providing in the copy object the substitute or replacement component for the at least one component of the object.

8. The apparatus of claim 7 wherein the apparatus comprises a copy machine.

9. The apparatus of claim 7 wherein the apparatus comprises a computer in communication with a printer.

10. The apparatus of claim 7 wherein the object comprises audio or video.

11. The apparatus of claim 7 wherein the signal comprises a plural-bit identifier.

12. The apparatus of claim 7 wherein the steganographic signal is hidden within the at least one component of the object with digital watermarking.

13. The apparatus of claim 7 wherein the substitute or replacement component comprises a pristine version of the at least one component of the object.

14. An apparatus comprising:
   a processor; and
   memory, said memory comprising instructions for execution by said processor, said instructions comprising instructions to:
   analyze data corresponding to a media object to obtain a first identifier steganographically hidden in a first component of the media object, and to obtain a second identifier steganographically hidden in a second component of the media object,
   obtain a substitute or replacement component for the first component using at least the first identifier,
   obtain a substitute or replacement component for the second component using at least the second identifier,
   provide an altered version of the media object, the altered version of the media object including the substitute or replacement component for the first component and the substitute or replacement component for the second component in place of the first component and the second component.

15. The apparatus of claim 14 wherein the first identifier and the second identifier are each steganographically hidden with digital watermarking.

16. The apparatus of claim 14 wherein the media object comprises audio or video.

17. The apparatus of claim 16 wherein the substitute or replacement component for the first component comprises audio or video.

18. The apparatus of claim 17 wherein the substitute or replacement component for the second component comprises audio or video.

19. The apparatus of claim 14 wherein the altered version of the media object comprises a digital copy of the media object.

20. A method comprising:
   utilizing a configured multi-purpose electronic processor, analyzing data corresponding to a media object to obtain a first identifier steganographically hidden in a first component of the media object, and to obtain a second identifier steganographically hidden in a second component of the media object;
   obtaining a substitute or replacement component for the first component using at least the first identifier;
   obtaining a substitute or replacement component for the second component using at least the second identifier; and
   providing an altered version of the media object, the altered version of the media object including the substitute or replacement component for the first component and the substitute or replacement component for the second component in place of the first component and the second component.

21. A computer readable medium comprising instructions stored thereon to cause a multi-purpose electronic processor to perform the method of claim 20.

22. A programmed computing device storing instructions in memory, said instructions are executable by said programmed computing device to perform the acts of claim 20.

23. The apparatus of claim 14, in which said processor is operating to perform at least one of the functions recited therein.

24. The apparatus of claim 7, in which said processor is operating to perform at least one of the functions recited therein.

25. A method comprising:
   utilizing a configured multi-purpose electronic processor, analyzing data corresponding to a media object to obtain first identifying data from a first component of the media object, the first component representing picture data or audible elements of the media object, and utilizing a configured multi-purpose electronic processor to obtain second identifying data from a second component of the media object, the second component representing picture data or audible elements of the media object;
   obtaining a substitute or replacement component for the first component using at least the first identifying data;
   obtaining a substitute or replacement component for the second component using at least the second identifying data; and
   providing an altered version of the media object, the altered version of the media object including the substitute or replacement component for the first component and the substitute or replacement component for the second component in place of the first component and the second component.

26. A computer readable medium comprising instructions stored thereon to cause a multi-purpose electronic processor to perform the method of claim 25.

27. A programmed computing device storing instructions in memory, said instructions are executable by said programmed computing device to perform the acts of claim 25.

* * * * *